United States Patent
Hoffmann et al.

(10) Patent No.: US 10,616,009 B1
(45) Date of Patent: Apr. 7, 2020

(54) SHARED MONITOR RECEIVER FOR LINEARIZATION IN MULTI-CHANNEL SYSTEMS

(71) Applicant: Rockwell Collins, Inc., Cedar Rapids, IA (US)

(72) Inventors: Theodore J. Hoffmann, Palo, IA (US); Russell D. Wyse, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/519,761

(22) Filed: Jul. 23, 2019

(51) Int. Cl.
*H04L 25/03* (2006.01)
*H01Q 3/26* (2006.01)
*H04B 1/04* (2006.01)

(52) U.S. Cl.
CPC ..... *H04L 25/03057* (2013.01); *H01Q 3/2694* (2013.01); *H04B 1/0475* (2013.01); *H04B 2001/0425* (2013.01)

(58) Field of Classification Search
CPC .............. H04B 7/08; H04B 2001/0425; H04B 1/0475; H04B 1/04; H04B 2001/0433; H04B 1/0483; H04L 25/0204; H04L 25/03; H04L 25/03057; H03F 1/3252; H01Q 3/2641; H01Q 3/2694; H01Q 3/26; H01Q 3/03
See application file for complete search history.

(56) References Cited

U.S. PATENT DOCUMENTS

2019/0036622 A1* 1/2019 Lagoy ............... H04L 25/03343

* cited by examiner

*Primary Examiner* — Rahel Guarino
(74) *Attorney, Agent, or Firm* — Suiter Swantz pc llo

(57) ABSTRACT

A communication device including a plurality of receive channels and/or a plurality of transmit channels is disclosed. The receive channels and/or the transmit channels are configured to share one or more monitor receivers for nonlinear equalization and/or digital predistortion functions.

15 Claims, 4 Drawing Sheets

SHARED MONITOR RECEIVER FOR LINEARIZATION IN MULTI-CHANNEL SYSTEMS

BACKGROUND

Communicating high data rates in limited bandwidth requires more complicated modulation schemes (e.g., OFDM, 64QAM, etc.) that depend on high linearity circuits. Furthermore, users must stay within their allocated channel and not encroach on adjacent channels—this also requires high linearity operation. It is also desirable to perform these operations with limited power consumption and/or dissipation (e.g., for airborne applications, Unmanned Aerial Vehicles (UAVs), batter power applications, etc.). However, traditional analog and RF circuit design techniques for high linearity applications require high power consumption and dissipation.

Techniques have been developed to run radio frequency (RF) and analog circuits at lower power and correct for nonlinearities and improve linearity with digital signal processing (e.g., Nonlinear Equalization (NLEQ) for receivers and Digital Predistortion (DPD) for transmitters). For robust operation over temperature, changing antenna impedance and aging of circuits, a monitor receiver is typically added to the system to monitor these effects and adapt the linearization processing parameters. In a system with multiple receive and transmit channels, implementing a monitor receiver for each channel adds substantial additional circuitry and complexity, resulting in increased cost, weight, power, and volume.

SUMMARY

A communication device including a plurality of receive channels and/or a plurality of transmit channels is disclosed. The receive channels and/or the transmit channels are configured to share one or more monitor receivers for nonlinear equalization and/or digital predistortion functions.

In one or more embodiments, the communication device includes a plurality of antenna elements with a plurality of receive channels for the antenna elements. Each receive channel includes a primary receiver coupled to a respective antenna element and a receiver analog-to-digital converter (ADC) configured to generate digital signals based on analog signals received from the primary receiver. At least one receive channel further includes a monitor receiver coupled to the respective antenna element for the receive channel and a monitor ADC configured to generate digital feedback signals based on analog feedback signals received from the monitor receiver. The communication device further includes a nonlinear equalizer configured to adjust one or more parameters of the digital signals generated by the receiver ADC of each receive channel. The nonlinear equalizer is tuned based on the digital feedback signals generated by the monitor ADC.

In some embodiments of the communication device, the communication device further includes at least one waveform processor configured to receive the digital signals from the nonlinear equalizer.

In some embodiments of the communication device, the monitor receiver is configured to detect signals from other antenna elements via the respective antenna element for the receive channel that includes the monitor receiver.

In some embodiments of the communication device, the receive channels are configured as a phased array, where the receive channels are configured to receive same radio frequency (RF) signals with time delays proportional to respective angles at which the RF signals are received by the phased array.

In some embodiments of the communication device, only one receive channel of the plurality of receive channels includes the monitor receiver, where the other receive channels are configured to share the monitor receiver of the one receive channel.

In some embodiments of the communication device, at least a first receive channel and a second receive channel of the plurality of receive channels include monitor receivers, where a first group of other receive channels are configured to share the monitor receiver of the first receive channel, and a second group of other receive channels are configured to share the monitor receiver of the second receive channel.

In some embodiments of the communication device, the communication device further includes a plurality of transmit channels, where each transmit channel includes a digital-to-analog converter (DAC) configured to generate analog transmission signals based on digital transmission signals received from a waveform processor after one or more parameters of the digital transmission signals are adjusted by a digital predistortion circuit.

In some embodiments of the communication device, the digital predistortion circuit is also tuned based on the digital feedback signals generated by the monitor ADC of the receive channel. Alternatively, the digital predistortion circuit may be tuned based on digital feedback signals generated by a respective monitor ADC for the transmit channel or a monitor ADC from another transmit channel of the plurality of transmit channels.

In one or more additional embodiments, the communication device includes a waveform processor configured to generate digital transmission signals and a digital predistortion circuit configured to adjust one or more parameters of the digital transmission signals. The communication device further includes a plurality of antenna elements and a plurality of transmit channels for the plurality of antenna elements. Each transmit channel includes a DAC configured to generate analog transmission signals based on the digital transmission signals received from the waveform processor after the one or more parameters of the digital transmission signals have been adjusted by the digital predistortion circuit. At least one transmit channel further includes a monitor receiver coupled to a respective antenna element for the transmit channel. The communication device further includes a monitor ADC configured to generate digital feedback signals based on analog feedback signals received from the monitor receiver. The digital predistortion circuit is tuned based on the digital feedback signals generated by the monitor ADC.

In some embodiments of the communication device, the monitor receiver is configured to detect signals from other antenna elements via the respective antenna element for the transmit channel that includes the monitor receiver.

In some embodiments of the communication device, the transmit channels are configured as a phased array, where the transmit channels are configured to transmit same RF signals with time delays proportional to respective angles at which the RF signals are transmitted by the phased array.

In some embodiments of the communication device, only one transmit channel of the plurality of transmit channels includes a monitor receiver, where the other transmit channels are configured to share the monitor receiver of the one transmit channel.

In some embodiments of the communication device, at least a first transmit channel and a second transmit channel of the plurality of transmit channels include monitor receivers, where a first group of other transmit channels are configured to share the monitor receiver of the first transmit channel, and a second group of other transmit channels are configured to share the monitor receiver of the second transmit channel.

In some embodiments of the communication device, the communication device further includes a plurality of receive channels, where each receive channel includes a primary receiver coupled to a respective antenna element of the plurality of antennal elements and a receiver ADC configured to generate digital signals based on analog signals received from the primary receiver.

In some embodiments of the communication device, the communication device further includes a nonlinear equalizer configured to adjust one or more parameters of the digital signals generated by the receiver ADC of each receive channel. The nonlinear equalizer may be tuned based on the digital feedback signals generated by the monitor ADC. Alternatively, the nonlinear equalizer may be tuned based on digital feedback signals generated by a respective monitor ADC for the receive channel or a monitor ADC from another receive channel of the plurality of receive channels.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
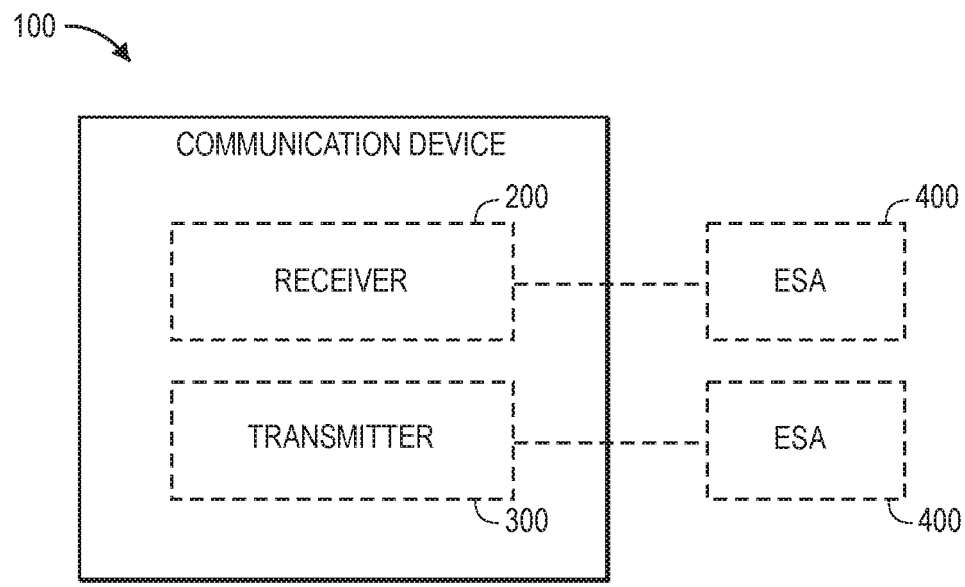
FIG. 1A is a block diagram illustrating a communication device that can include at least one shared monitor receiver for a plurality of receiver and/or transmit channels, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Now referring to FIGS. 1A through 5, a communication device 100 including a plurality of receive channels and/or a plurality of transmit channels is disclosed. As described below, the receive channels and/or the transmit channels of the communication device 100 are configured to share one or more monitor receivers for nonlinear equalization and/or digital predistortion functions.

Techniques have been developed to run radio frequency (RF) and analog circuits at lower power and correct for nonlinearities and improve linearity with digital signal processing (e.g., Nonlinear Equalization (NLEQ) for receivers and Digital Predistortion (DPD) for transmitters). For robust operation over temperature, changing antenna impedance and aging of circuits, a monitor receiver is typically added to the system to monitor these effects and adapt the linearization processing parameters.

For receivers, the standard solution has been to pair a monitor receiver with receive channel being linearized. Similarly, for transmitters, the standard solution has been to pair a monitor receiver with transmit channel being linearized. Implementing a monitor receiver for each channel adds substantial additional circuitry and complexity, resulting in increased cost, weight, power, and volume. For example, consider a 16-element array with simultaneous dual polarization employing linearization:

Total Receivers=Primary Receivers+NLEQ Monitor Receivers+DPD Monitor Receivers

Total Receivers=(16*2)+(16*2)+(16*2)=96 receivers

In many applications for multi-channel systems, it is possible to share a monitor receiver across multiple primary receivers and/or transmitters. This is especially true in phased array systems where all the receive channels may receive the same signal, but time delayed at each element proportional to the angle at which the signal is received by the array. Similarly, all the transmitters in a phased array system may transmit the same signal, but time delayed at each element proportional to the angle at which the signal is transmitted by the array. In many systems, the time delay can be approximated as a phase shift.

Consider the previous example of a 16-element array with simultaneous dual polarization employing linearization. Assume that this system operates in half-duplex mode and there is moderate isolation between polarizations (~10 dB). If a single monitor channel is shared across all modes of operation, the number of receivers is substantially reduced:

Total Receivers=Primary Receivers+NLEQ Monitor Receivers+DPD Monitor Receivers

Total Receivers=(16*2)+1=33 receivers

The conventional approach requires nearly 3× as many total receivers compared to sharing receivers (96 vs. 33 receivers).

Other ratios of monitor channels in the systems are also useful to consider. For example, suppose the antenna elements have much higher isolation between polarizations and that it is not feasible to share a monitor channel between receive and transmit operations. In this case, more monitor receivers may be needed, for example:

Total Receivers=Primary Receivers+NLEQ Monitor Receivers+DPD Monitor Receivers

Total Receivers=(16*2)+2+2=36 receivers

There are still considerable savings over the traditional approach. The conventional approach requires nearly 3× as many total receivers compared to sharing receivers (96 vs. 36 receivers).

At larger array sizes, it may be desirable to have more than one monitor receiver per polarization and receive or transmit. For example, a common building block of 16 elements may be instantiated multiple times to form a larger array of 2×N elements. In this case, the system may include a dedicated monitor receiver for each 16-element building block vs. the entire array. This is also useful if the array may be partitioned to transmit unique signals in portions of the array or if different portions are operating at different frequencies.

The examples herein are provided to better explain and illustrate advantages of the systems/devices described herein. However, the numerical values (e.g., number of elements, number of receivers, etc.) provided in the examples are arbitrary. In general, there may be any number of shared monitor receivers for any grouping of receive/transmit channels, depending on the requirements of any particular application.

Figure 1B:
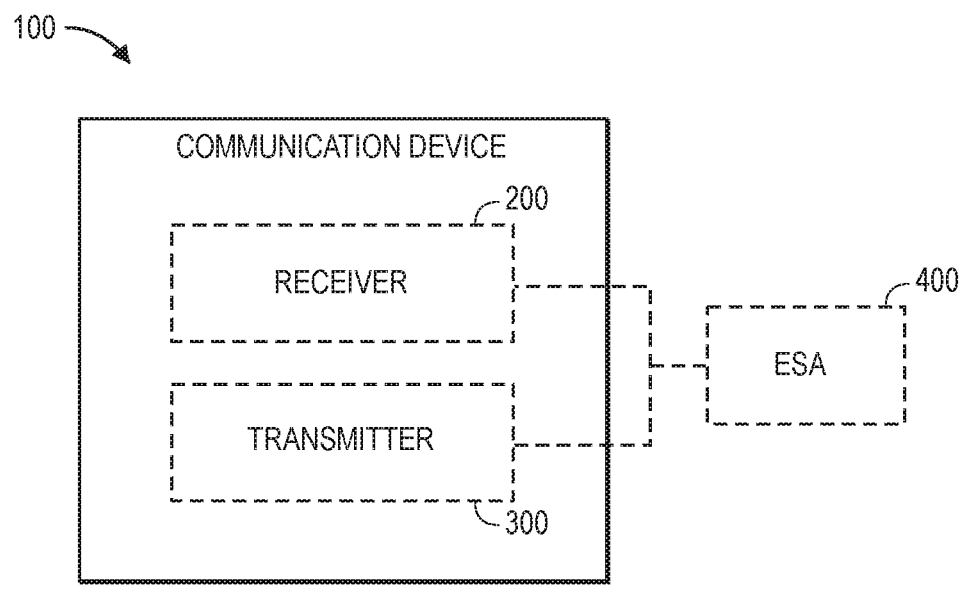
FIG. 1B is a block diagram illustrating a communication device that can include at least one shared monitor receiver for a plurality of receiver and/or transmit channels, in accordance with one or more embodiments of this disclosure.

FIGS. 1A and 1B illustrate various embodiments of the communication device 100, which may include a receiver 200 and/or a transmitter 300. In some embodiments, such as the embodiment illustrated in FIG. 1A, the receiver 200 is coupled to a respective antenna array 400 (e.g., an electronically scanned array (ESA), or the like), and the transmitter 300 is also coupled to a respective (additional) antenna array 400. The antenna arrays 400 may be interleaved, side-by-side, or otherwise configured. For example, each transmit/receive channel may be coupled to a respective antenna element 402 of the respective transmit/receive antenna array 400. In other embodiments, such as the embodiment illustrated in FIG. 1B, the receiver 200 and the transmitter 300 may share an antenna array 400. For example, each pair of transmit and receive channels may be coupled to a shared antenna element 402 of the antenna array 400. Furthermore, in some embodiments, the receiver 200 and the transmitter 300 may form portions of a transceiver with one or more circuit components shared between the receiver 200 and the transmitter 300 portions of the transceiver.

Figure 2:
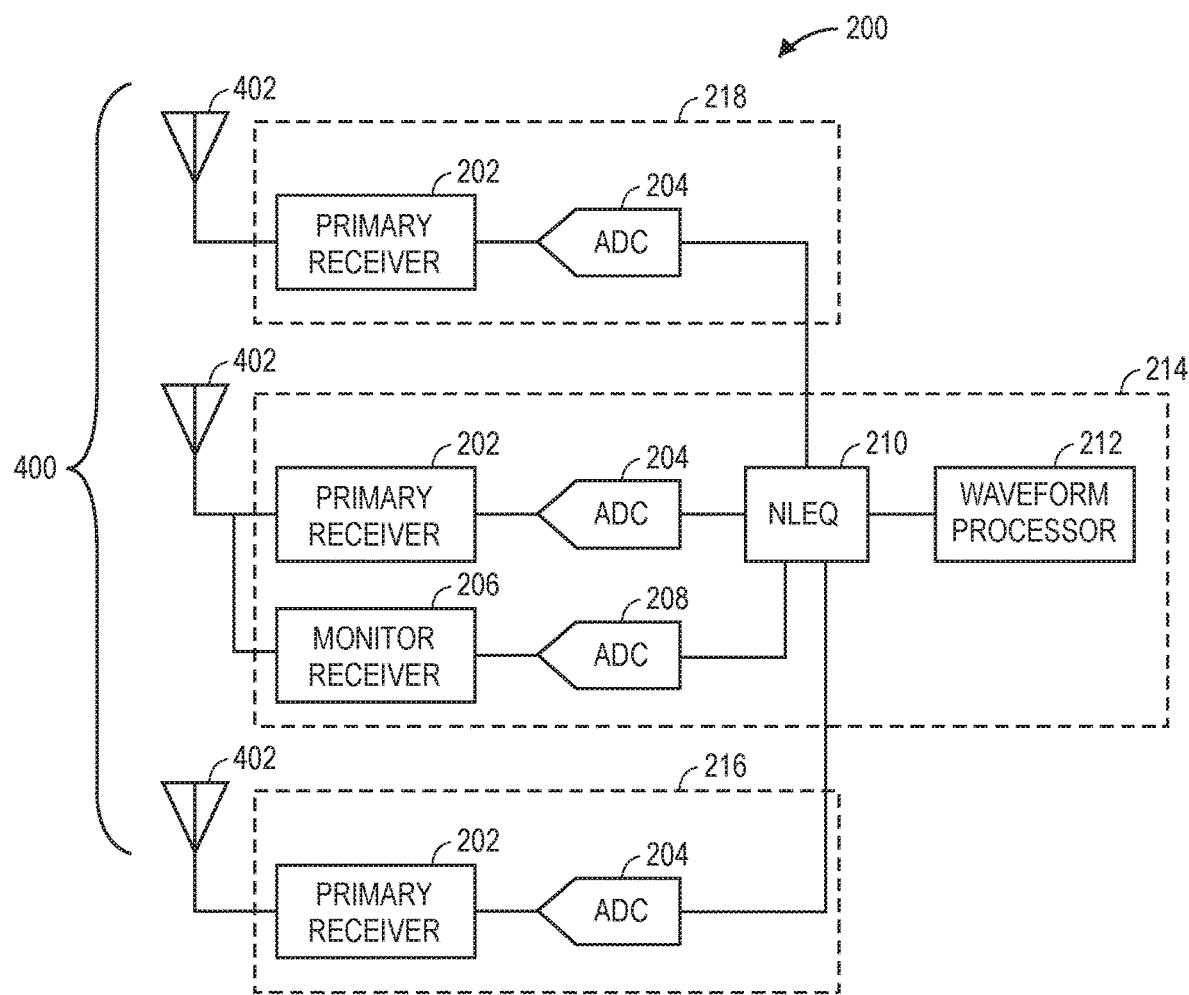
FIG. 2 is a block diagram illustrating a receiver including a monitor receiver that is shared by a plurality of receive channels, in accordance with one or more embodiments of this disclosure.

As shown in FIG. 2, the receiver 200 includes a plurality of receive channels (e.g., channels 214, 216, 218, etc.) configured to be communicatively coupled to respective antenna elements 402 of an antenna array 400. In embodiments, each receive channel includes a primary receiver 202 coupled to a respective antenna element 402 and a receiver analog-to-digital converter (ADC) 204 configured to generate digital signals based on analog signals received from the primary receiver 202. At least one of the receive channels (e.g., channel 214) further includes a monitor receiver 206 coupled to the respective antenna element 402 for the receive channel 214 and a monitor ADC 208 configured to generate digital feedback signals based on analog feedback signals received from the monitor receiver 206.

The receiver 200 further includes a nonlinear equalizer 210 configured to adjust one or more parameters of the digital signals generated by the receiver ADC 204 of each receive channel (e.g., channels 214, 216, 218, etc.). The nonlinear equalizer 210 is tuned based on the digital feedback signals generated by the monitor ADC 208 of receive channel 214. In this manner, all the receive channels (e.g., channels 214, 216, 218, etc.) can share the monitor receiver 206 of receive channel 214. The receive channels (e.g., channels 214, 216, 218, etc.) may also share the monitor ADC 208, nonlinear equalizer 210, and a waveform processor 212 (e.g., a digital signal processor) that is configured to receive the digital signals from the nonlinear equalizer 210. In some embodiments, the nonlinear equalizer 210 is part of the waveform processor 212 (e.g., in the form of one or more software modules executed by the digital signal processor).

Figure 5:
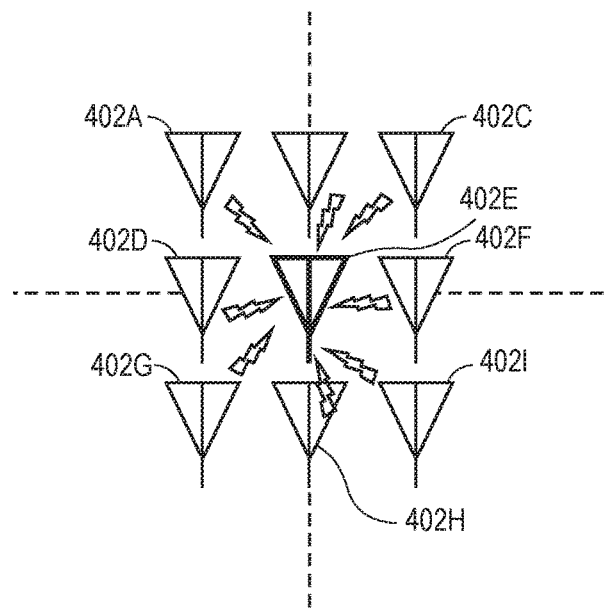
FIG. 5 is a block diagram illustrating an antenna array, where at least one antenna is configured to detect signals radiated by other antennas of the antenna array, in accordance with one or more embodiments of this disclosure.

The monitor receiver 206 is configured to detect signals from other antenna elements 402 to tune the nonlinear equalizer 210 when processing other receive channels (e.g., channels 216, 218, etc.) via the respective antenna element 402 for the receive channel 214 that includes the monitor receiver 206. For example, as shown in FIG. 5, an antenna element 402E may be configured to detect signals received at or radiated by other antenna elements (e.g., elements 402A, 402B, 402C, 402D, 402F, 402G, 402H, 402I, etc.) of an antenna array 400. In some embodiments, the receive channels (e.g., channels 214, 216, 218, etc.) are configured as a phased array, where the receive channels (e.g., channels 214, 216, 218, etc.) are configured to receive the same RF signals with time delays proportional to respective angles at which the RF signals are received by the phased array. In this case, a timing algorithm may be used to retune the nonlinear equalizer 210 for each of the channels based on RF signals detected by the monitor receiver 206. For example, each of the channels may be allocated one or more time slots for detecting the RF signals received by that channel.

In some embodiments, only one receive channel (e.g., channel 214) of the plurality of receive channels (e.g., channels 214, 216, 218, etc.) includes the monitor receiver 206, where the other receive channels (e.g., channels 216, 218, etc.) are configured to share the monitor receiver 206 of the one receive channel (e.g., channel 214). However, in other embodiments, the receiver 200 may include several groups of receive channels, where each group of receive channels shares a monitor receiver (e.g., in the same manner as the channels 214, 216, 218 illustrated in FIG. 2). For example, at least a first receive channel and a second receive channel of the plurality of receive channels may include monitor receivers, where a first group of other receive channels are configured to share the monitor receiver of the first receive channel, and a second group of other receive channels are configured to share the monitor receiver of the second receive channel.

Figure 3:
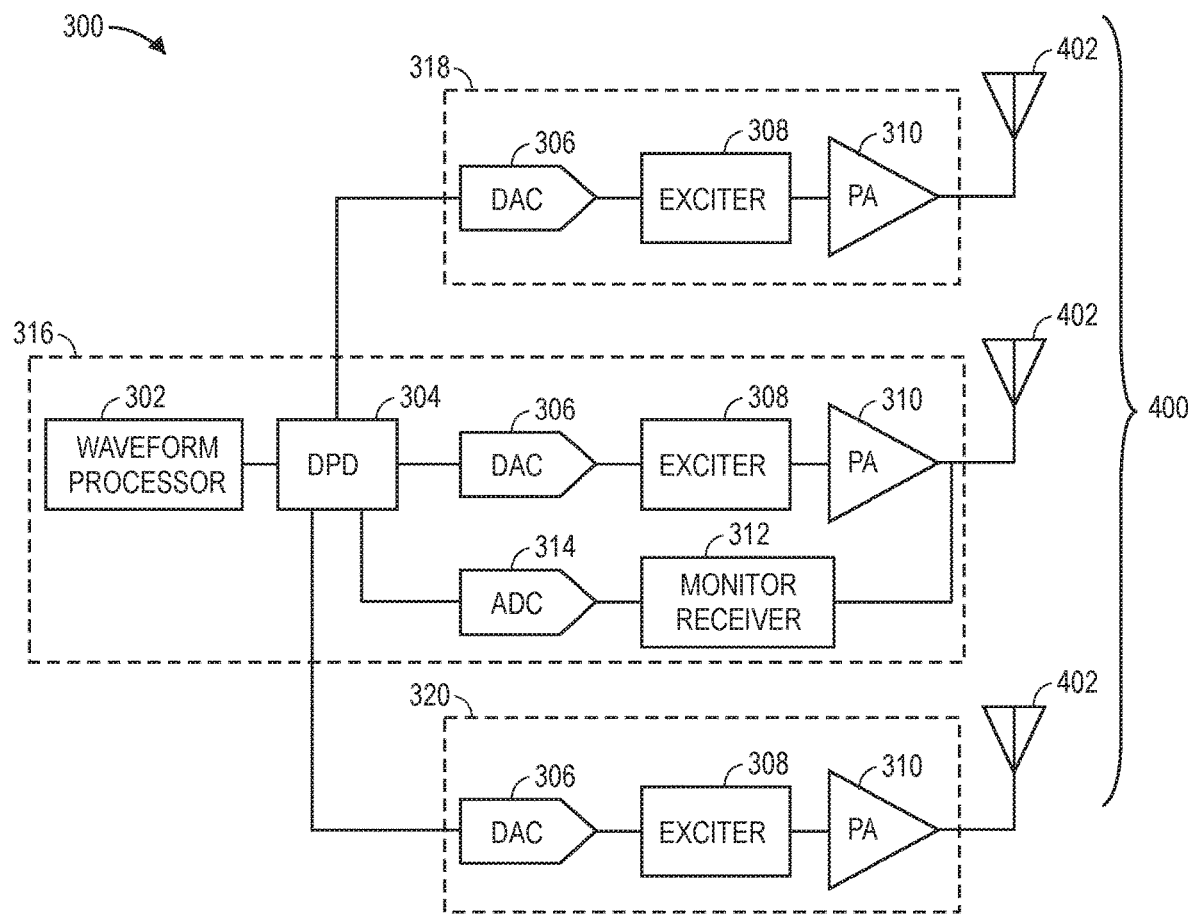
FIG. 3 is a block diagram illustrating a transmitter including a monitor receiver that is shared by a plurality of transmit channels, in accordance with one or more embodiments of this disclosure.

Referring now to FIG. 3, the transmitter 300 includes a plurality of transmit channels (e.g., channels 316, 318, 320, etc.) configured to be communicatively coupled to respective antenna elements 402 of an antenna array 400 (e.g., the same array as the receiver 200 or a different antenna array). In embodiments, each transmit channel includes a DAC 306 configured to generate analog transmission signals based on digital transmission signals received from a waveform processor 302 (e.g., digital signal processor) after one or more parameters of the digital transmission signals have been adjusted by a digital predistortion circuit 304. Each transmit channel may also include an exciter 308 and a power amplifier 310 configured to control frequency and amplitude of the analog transmission signals generated by the DAC 306.

At least one of the transmit channels (e.g., channel 316) further includes a monitor receiver 312 coupled to the respective antenna element 402 for the transmit channel 316 and a monitor ADC 314 configured to generate digital feedback signals based on analog feedback signals received from the monitor receiver 312. The digital predistortion circuit 304 is tuned based on the digital feedback signals generated by the monitor ADC 314 of transmit channel 316. In this manner, all the transmit channels (e.g., channels 316, 318, 320, etc.) can share the monitor receiver 312 of transmit channel 316. The transmit channels (e.g., channels 316, 318, 320, etc.) may also share the monitor ADC 314, digital predistortion circuit 304, and waveform processor 302. In some embodiments, the digital predistortion circuit 304 is part of the waveform processor 302 (e.g., in the form of one or more software modules executed by the digital signal processor).

The monitor receiver 312 is configured to detect signals from other antenna elements 402 to tune the digital predistortion circuit 304 when processing other transmit channels (e.g., channels 318, 320, etc.) via the respective antenna element 402 for the transmit channel 316 that includes the monitor receiver 312. For example, as shown in FIG. 5, an antenna element 402E may be configured to detect signals received at or radiated by other antenna elements (e.g., elements 402A, 402B, 402C, 402D, 402F, 402G, 402H, 402I, etc.) of an antenna array 400. In some embodiments, the transmit channels (e.g., channels 316, 318, 320, etc.) are configured as a phased array, where the transmit channels (e.g., channels 316, 318, 320, etc.) are configured to transmit the same RF signals with time delays proportional to respective angles at which the RF signals are transmitted by the phased array. In this case, a timing algorithm may be used to retune the digital predistortion circuit 304 for each of the channels based on RF signals detected by the monitor receiver 312. For example, each of the channels may be allocated one or more time slots for detecting the RF signals radiated by the respective antenna element 402 for that channel.

In some embodiments, only one transmit channel (e.g., channel 316) of the plurality of transmit channels (e.g., channels 316, 318, 320, etc.) includes the monitor receiver 312, where the other transmit channels (e.g., channels 318, 320, etc.) are configured to share the monitor receiver 312 of the one transmit channel (e.g., channel 316). However, in other embodiments, the transmitter 300 may include several groups of transmit channels, where each group of transmit channels shares a monitor receiver (e.g., in the same manner as the channels 316, 318, 320 illustrated in FIG. 3). For example, at least a first transmit channel and a second transmit channel of the plurality of transmit channels may include monitor receivers, where a first group of other transmit channels are configured to share the monitor receiver of the first transmit channel, and a second group of other transmit channels are configured to share the monitor receiver of the second transmit channel.

Figure 4:
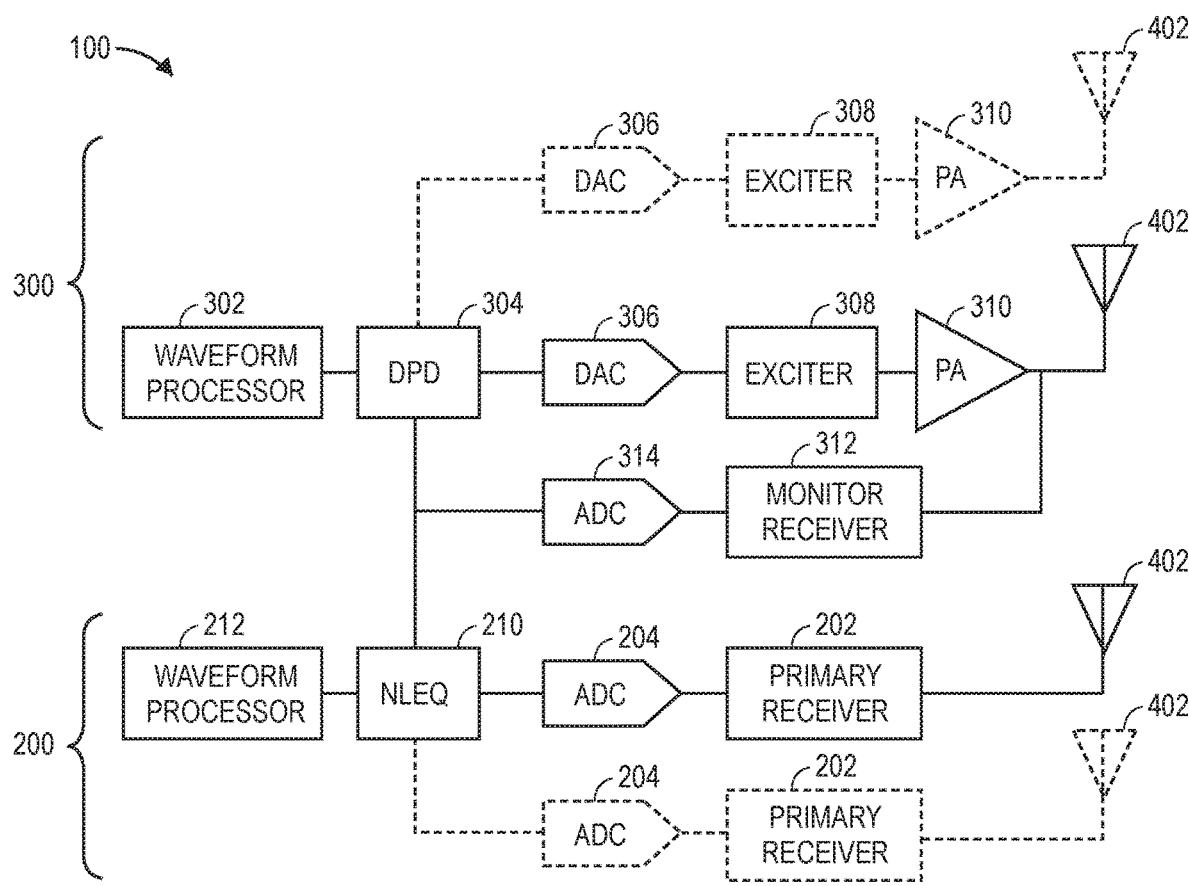
FIG. 4 is a block diagram illustrating a communication device including a monitor receiver that is shared by a plurality of transmit channels and a plurality of receive channels, in accordance with one or more embodiments of this disclosure.

In some embodiments, such as the embodiment illustrated in FIG. 4, a monitor receiver (e.g., monitor receiver 312) may be shared between transmitter 300 and receiver 200 portions of the communication device 100. For example, the digital predistortion circuit 304 and the nonlinear equalizer 210 may both be tuned based on the digital feedback signals generated by the monitor ADC 314 (e.g., using a timing algorithm and/or switches for signal isolation). Alternatively, the nonlinear equalizer may be tuned based on digital feedback signals generated by a respective monitor ADC for the receive channel or a monitor ADC from another receive channel of the plurality of receive channels.

Although FIG. 4 illustrates an embodiment where a monitor receiver 312 of a transmit channel is shared between a plurality of transmit and receive channels of the communication device 100; in other embodiments, the monitor receiver (e.g., monitor receiver 206) of a receive channel can be similarly configured so that the digital predistortion circuit 304 and the nonlinear equalizer 210 may both be tuned based on the digital feedback signals generated by the monitor ADC (e.g., monitor ADC 208) of the receive channel (e.g., using a timing algorithm and/or switches for signal isolation). In this regard, the signal path including the monitor receiver (e.g., monitor receiver 206/312) functions as its own "monitor channel," where the monitor channel is coupled to an antenna element 402 for a receive channel, a transmit channel, or a pair of receive/transmit channels and is configured to provide monitor functionality for the receive and/or transmit channel of the antenna element 402 that the monitor channel is coupled to and also for a plurality of other receive and/or transmit channels of the antenna array 400.

In some embodiments, waveform processor 302 and waveform processor 212 are the same processor (e.g., the same digital signal processor). Alternatively, waveform processor 302 and waveform processor 212 may be separate elements (e.g., separate digital signal processors). The waveform processor 302/212 provides processing functionality for the communication device 100 and can include any number of processors, micro-controllers, circuitry, field programmable gate array (FPGA) or other processing systems, and resident or external memory for storing data, executable code, and other information accessed or generated by the communication device 100. The waveform processor 302/212 can execute one or more software programs embodied in a non-transitory computer readable medium that implement techniques or functions (e.g., NLEQ, DPD functions, etc.) described herein. The waveform processor 302/212 is not limited by the materials from which it is formed, or the processing mechanisms employed therein and, as such, can be implemented via semiconductor(s) and/or transistors (e.g., using electronic integrated circuit (IC) components), and so forth.

Various embodiments of a communication device 100, receiver 200, transmitter 300, and antenna array 400 have been described with reference to FIGS. 1A through 5. However, in other embodiments, the communication device 100, receiver 200, transmitter 300, and/or antenna array 400 may be modified without deviating from the scope of this disclosure. For example, any of the components (e.g., waveform processors, receivers, NLEQs, DPDs, ADCs, DACs, exciters, amplifiers, antennas, etc.) described herein may be implemented by a plurality of components. In this regard, any reference to "a" or "the" component should be understood as a reference to "one or more" of the same component.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A communication device, comprising:
    a plurality of antenna elements;
    a plurality of receive channels for the plurality of antenna elements, each receive channel of the plurality of receive channels including:
        a primary receiver coupled to a respective antenna element of the plurality of antennal elements; and
        a receiver analog-to-digital converter (ADC) configured to generate digital signals based on analog signals received from the primary receiver;
    at least one receive channel of the plurality of receive channels further including:
        a monitor receiver coupled to the respective antenna element for the at least one receive channel; and
        a monitor ADC configured to generate digital feedback signals based on analog feedback signals received from the monitor receiver;
    a nonlinear equalizer configured to adjust one or more parameters of the digital signals generated by the receiver ADC of each receive channel, wherein the nonlinear equalizer is tuned based on the digital feedback signals generated by the monitor ADC.

2. The communication device of claim 1, further comprising:
    at least one waveform processor configured to receive the digital signals from the nonlinear equalizer.

3. The communication device of claim 1, wherein the monitor receiver is configured to detect signals from other antenna elements of the plurality of antenna elements via the respective antenna element for the at least one receive channel.

4. The communication device of claim 1, wherein the plurality of receive channels are configured as a phased array, wherein the plurality of receive channels are configured to receive same radio frequency (RF) signals with time delays proportional to respective angles at which the RF signals are received by the phased array.

5. The communication device of claim 1, wherein the at least one receive channel comprises only one receive channel of the plurality of receive channels, wherein other receive channels of the plurality of receive channels are configured to share the monitor receiver of the one receive channel.

6. The communication device of claim 1, wherein the at least one receive channel comprises at least a first receive channel and a second receive channel of the plurality of receive channels, wherein a first group of other receive channels of the plurality of receive channels are configured to share the monitor receiver of the first receive channel, and wherein a second group of other receive channels of the plurality of receive channels are configured to share the monitor receiver of the second receive channel.

7. The communication device of claim 1, further comprising:
    a plurality of transmit channels, each transmit channel of the plurality of transmit channels including a digital-to-analog converter (DAC) configured to generate analog transmission signals based on digital transmission signals received from a waveform processor after one or more parameters of the digital transmission signals are adjusted by a digital predistortion circuit.

8. The communication device of claim 7, wherein the digital predistortion circuit is tuned based on the digital feedback signals generated by the monitor ADC.

9. A communication device, comprising:
    a waveform processor configured to generate digital transmission signals;
    a digital predistortion circuit configured to adjust one or more parameters of the digital transmission signals;
    a plurality of antenna elements;
    a plurality of transmit channels for the plurality of antenna elements, each transmit channel of the plurality of transmit channels including:
        a digital-to-analog converter (DAC) configured to generate analog transmission signals based on the digital transmission signals received from the waveform processor after the one or more parameters of the digital transmission signals have been adjusted by the digital predistortion circuit;
    at least one transmit channel of the plurality of transmit channels further including:
        a monitor receiver coupled to a respective antenna element for the at least one transmit channel; and
        a monitor analog-to-digital converter (ADC) configured to generate digital feedback signals based on analog feedback signals received from the monitor receiver, wherein the digital predistortion circuit is tuned based on the digital feedback signals generated by the monitor ADC.

10. The communication device of claim 9, wherein the monitor receiver is configured to detect signals from other antenna elements of the plurality of antenna elements via the respective antenna element for the at least one transmit channel.

11. The communication device of claim 9, wherein the plurality of transmit channels are configured as a phased array, wherein the plurality of transmit channels are configured to transmit same radio frequency (RF) signals with time delays proportional to respective angles at which the RF signals are transmitted by the phased array.

12. The communication device of claim 9, wherein the at least one transmit channel comprises only one transmit channel of the plurality of transmit channels, wherein other transmit channels of the plurality of transmit channels are configured to share the monitor receiver of the one transmit channel.

13. The communication device of claim 9, wherein the at least one transmit channel comprises at least a first transmit channel and a second transmit channel of the plurality of transmit channels, wherein a first group of other transmit channels of the plurality of transmit channels are configured to share the monitor receiver of the first transmit channel, and wherein a second group of other transmit channels of the plurality of transmit channels are configured to share the monitor receiver of the second transmit channel.

14. The communication device of claim 9, further comprising:
    a plurality of receive channels, each receive channel of the plurality of receive channels including:
        a primary receiver coupled to a respective antenna element of the plurality of antennal elements; and
        a receiver ADC configured to generate digital signals based on analog signals received from the primary receiver.

15. The communication device of claim 14, further comprising:
    a nonlinear equalizer configured to adjust one or more parameters of the digital signals generated by the receiver ADC of each receive channel, wherein the nonlinear equalizer is tuned based on the digital feedback signals generated by the monitor ADC.

* * * * *